(12) United States Patent
Galin

(10) Patent No.: US 12,346,078 B2
(45) Date of Patent: Jul. 1, 2025

(54) COMMUNICATION PROTOCOL FOR DISTRIBUTED ENERGY MANAGEMENT

(71) Applicant: Solaredge Technologies Ltd., Herzeliya (IL)

(72) Inventor: Yoav Galin, Raanana (IL)

(73) Assignee: Solaredge Technologies Ltd., Herzeliya (IL)

( * ) Notice: Subject to any disclaimer, the term of this patent is extended or adjusted under 35 U.S.C. 154(b) by 0 days.

(21) Appl. No.: 18/672,511

(22) Filed: May 23, 2024

(65) Prior Publication Data

US 2024/0402669 A1 Dec. 5, 2024

Related U.S. Application Data

(63) Continuation of application No. 18/070,581, filed on Nov. 29, 2022, now Pat. No. 12,025,965, which is a
(Continued)

(51) Int. Cl.
*G05B 19/042* (2006.01)
*H04L 12/18* (2006.01)
*H04L 67/12* (2022.01)

(52) U.S. Cl.
CPC ............ *G05B 19/042* (2013.01); *H04L 12/18* (2013.01); *H04L 67/12* (2013.01); *G05B 2219/2639* (2013.01)

(58) Field of Classification Search
CPC .......... G05B 19/042; G05B 2219/2639; H04L 12/18; H04L 67/12; H02J 7/35; H02J 13/00004; H02J 2203/10; H02J 2300/24; H02J 3/381; H02J 3/14; H02J 3/28; Y02B 70/30; Y02B 70/3225; Y02E 10/56; Y02E 40/70; Y04S 10/123; Y04S 20/20; Y04S 20/222
See application file for complete search history.

(56) References Cited

U.S. PATENT DOCUMENTS 5,028,859 A 7/1991 Johnson et al.
6,633,823 B2 10/2003 Bartone et al.
(Continued)

FOREIGN PATENT DOCUMENTS

CN 106169774 A 11/2016
EP 3349317 A1 7/2018
(Continued)

OTHER PUBLICATIONS

Feb. 21, 2020—EP Search Report—EP 19217999.2.
(Continued)

*Primary Examiner* — Yuhui R Pan
(74) *Attorney, Agent, or Firm* — Banner & Witcoff, Ltd.

(57) ABSTRACT

A system, a device, a method, a communication protocol, and/or the like, for energy management in a fragment, heterogeneous, electrical grid. The grid may include multiple types of power generation systems, electrical energy storage systems, electrical loads, and efficiently managing these systems may require elements that will bridge the technology gap of these systems, as well as provide best-effort power generation and consumption in order to stabilize the grid. These techniques are especially important in differentiated electric energy networks, such as micro-grids, island grids, virtual power plants, and/or the like.

20 Claims, 6 Drawing Sheets

Related U.S. Application Data continuation of application No. 16/721,074, filed on Dec. 19, 2019, now Pat. No. 11,550,279.

(60) Provisional application No. 62/782,469, filed on Dec. 20, 2018.

(56) References Cited

U.S. PATENT DOCUMENTS

| | | | |
|---|---|---|---|
| 7,385,373 | B2 | 6/2008 | Doruk et al. |
| 7,508,173 | B2 | 3/2009 | Zhou et al. |
| 9,645,596 | B1 | 5/2017 | Lee et al. |
| 9,889,760 | B2 | 2/2018 | Jefferies et al. |
| 2007/0005195 | A1 | 1/2007 | Pasquale et al. |
| 2010/0052425 | A1 | 3/2010 | Moore et al. |
| 2012/0029720 | A1 | 2/2012 | Cherian et al. |
| 2016/0370125 | A1 | 12/2016 | Gilbert |
| 2019/0334352 | A1 | 10/2019 | Sugimoto et al. |

FOREIGN PATENT DOCUMENTS

| | | |
|---|---|---|
| WO | 2010103650 A1 | 9/2010 |
| WO | 2018150604 A1 | 8/2018 |

OTHER PUBLICATIONS

S. Javaid, "Stability and Power Control for Smart Home Energy Management System," Japan Advanced Institute of Science and Technology, Sep. 2014.
"USEF: Workstream on Aggregator Implementation Models," USEF, Sep. 2017.
M. Pochacker et al., "Simulating the Smart Grid," In Proceedings of the 2013 IEEE Grenoble PowerTech (POWERTECH), Grenoble, France, Jun. 16-20, 2013.
C. Save, "Self-Organizing and Communication Networks for Microgrids," University of Colorado, 2012.
J. Kadam et al., "Sensitivity-Based Solution Updates in Closed-Loop Dynamic Optimization," IFAC Proceedings vols. vol. 37, Iss. 9, Jul. 2004.
L. Vasquez et al., "Optimal Energy Management within a Microgrid: A Comparative Study," Energies, 11, 2167, Aug. 2018.
M. Pochacker et al., "The Microgrid Simulation Tool RAPSim: Description and Case Study," IEEE Innovative Smart Grid Technologies—Asia, 2014.
Nusawardhana et al., "Simultaneous Pertubation Extremum Seeking Method for Dynamic Optimizatin Problems," American Control Conference 2004, 2805-2810.
A. G. Manur, "Microgrid Energy Management System," University of Wisconsin-Madison, Dec. 2015.
S. Hanley, "New Study Looks At Managing Grid Frequency Fluctuations From Renewables," Clean Technica, 2018, accessed from https://cleantechnica.com/2018/01/12/new-study-looks-managing-grid-frequency-fluctuations-renewables/.
G. Giannakis et al. "Monitoring and Optimization for Power Grids: A Signal Processing Perspective," IEEE Signal Processing Magazine, Feb. 2013.
J. D. Kueck et al., "Microgrid Energy Management System," U.S. Department of Energy, Jan. 2003.
Y. Amirat et al., "Smart Grid Voltage Sag Detection using Instataneous Features Extraction," IEEE IECON 2013, Austria.
A. Greenhall et al., "Minpower: A Power System Optimization Toolkit," IEEE Power and Energy Society General Meeting, Jul. 2012.
J. Kuang et al., "Dynamic Optimization of Combined Cooling, Heating, and Power Systems with Energy Storage Units," Energies, 11, 2288, Aug. 2018.
A. Bani-Ahmed et al., "Microgrid Communications: State of the Art and Future Trends," IEEE 3rd International Conference on Renewable Energy Research and Applications, Oct. 2014.
S. Galli et al., "For grid and Through the Grid: The Role of Power Line Communications in the Smart Grid," IEEE Access, Juy 2019.
"Understanding electricity markets in the EU," European Parliament Briefing, Nov. 2016.
R. H. Byrne et al., "Energy Management and Optimization Methods for Grid Energy Storage System," IEEE Access, Mar. 2018.
E. Banguero et al., "A Review on Battery Charging and Discharging Control Strategies: Application to Renewable Energy Systems," Energies 11, 1021, Apr. 2018.
B. Faessler et al., "Battery Storage Systems as Grid-Balancing Measure in Low-Voltage Distribution Grids with Distributed Generation," Energies, 10, 2161, Dec. 2017.
P. H. Divshali et al., "Electrical Market Management Considering Power System Constraints in Smart Distribution Grids," Energies, 9, 405, May 2016.
L. Piegari et al., "Optimized Adaptive Perturb and Observe Maximum Power Point Tracking Control for Photovoltaic Generation," Energies 8, 3418-3436, Apr. 2015.
L. Dantas et al., "A Robust and Fast Generic Voltage Sag Detection Technique," Proceedings of 2015 IEEE 13th Brazilian Power Electronics Conference and 1st Southern Power Electronics Conference, 2015.
N. Poulsen, "Dynamic Optimization,"The Technical University of Denmark, Jan. 2012.
H. Pourbabak et al., "Control and Energy Management System in Microgrids," Chapter 3.
C. Hill et al., "Battery Energy Storage for Enabling Integration of Distributed Solar Power Generation," IEEE Transactions on Smart Grid, vol. 3, No. 2, Jun. 2012.
J. Mulenga, "Dynamic Optimization," Chapter 7.
R. Naidoo et al., "A New Method of Voltage Sag and Swell Detection," IEEE Transactions on Power Delivery, vol. 22, No. 2, Apr. 2007.
H. Dai et al., "A Literature Review of Stochastic Programming and Unit Commitment," Journal of Power and Energy Engineering, 3, pp. 206-214, Apr. 2015.
"'Grid 2030' A National Vision for Electricity's Second 100 Years," United States Department of Energy, Jul. 2003.
E. Namor et al., "Control of Battery Storage Systems for the Simultaneous Provision of Multiple Services," IEEE Transactions on Smart Grid, Febraury 2018.
M. Vasak et al., "Comparison of Battery Management Approaches for Energy Flow Optimization in Microgrids," IEEE International Power Electronics and Motion Control Conference, Sep. 2016.
P. Klauer, "Multi-Agency Update on VGI Research," California Energy Commission, Dec. 2017.
H. Yarmohamadi et al., "A New Dynamic Simulated Annealing Algorithm for Global Optimization," Journal of Mathematics and Computer Science, Vo. 14, Iss. 1, Nov. 2015.
M. Mansor et al., "Voltage Sag Detection—A Survey," International Conference for Technical Postgraduates, pp. 1-6, Dec. 2009.
"Introduction to the Unit Commitment Problem in Electric Power Production," NTNU—Trongheim, Norwegian University of Science and Technology.
E. Lee et al., "Design and Implementation of a Microgrid Energy Management System," MDPI Sustainability, 8, 1143, Nov. 2016.
A. Bhardwaj et al., "Unit commitment in electrical power system—a literature reveiw," 2012 IEEE International Power Engineering and Optimization Conference Melaka, Malaysia, Jun. 2012.
S. Aslam et al., "Towards Efficient Energy Management and Power Trading in a Residential Area via Integrating a Grid-Connected Microgrid," MDPA Sustainability 10, 1245, Apr. 2018.
F. Milano et al., "State of the Art and Future of OSS for Power Systems," IEEE PES General Meeting, 2009.
J. St. John, "How HECO is Using Enphase's Data to Open its Grid to More Solar," Green Tech Media, Apr. 2015, accessed from https://www.greentechmedia.com/articles/read/how-heco-is-using-enphase-data-to-open-its-grid-to-more-solar#gs.n8OSjBE.
Jan. 13, 2024—CN Office Action—CN App. No. 201911326120.X.

COMMUNICATION PROTOCOL FOR DISTRIBUTED ENERGY MANAGEMENT

CROSS-REFERENCE TO RELATED APPLICATIONS

The present application is a continuation of U.S. application Ser. No. 18/070,581, filed Nov. 29, 2022, which is a continuation of U.S. application Ser. No. 16/721,074, filed Dec. 19, 2019 (now U.S. Pat. No. 11,550,279), which claims priority to U.S. Provisional Application No. 62/782,469, filed Dec. 20, 2018, entitled "Communication Protocol For Distributed Energy Management," which are hereby incorporated by reference in their entireties.

BACKGROUND

The present disclosure relates to the field of electricity grids.

Networks of multiple distributed electrical power generation systems (PGSs), electrical storage, and loads, such as grids, micro-grids, or the like, may include many heterogeneous renewable energy power generation systems, battery storage systems, combined storage and generation systems, electric load centers, commercial electric loads, residential electric loads, and the like. For example, each of the systems in the network may be controlled by different owners with different priorities in balancing their own needs and the grid's needs. For example, a single owner may have a large site or campus with many systems. The systems will be heterogeneous by nature, such as each system may be of different model years, different manufactures, different models, different power devices, different generations (such as legacy products), different production/storage costs, and/or the like.

In smart power networks, communication protocols may be used to balance the generation systems against the electrical loads across the network. Communication protocols are typically developed to meet different requirements of the network design, and include a central controller that is configured to manage the energy generation, storage, and loads of the network. Devices, such as Phasor Measurement Units (PMUs) or the like, may comprise multiple sensors for assessing grid electrical parameters, such as the current, voltage, phase, grid loads, and/or others. These PMU measured parameters may be sent to the central controller for evaluating the status and selecting actions to improve the grid performance.

SUMMARY

The following summary is a short summary of some of the inventive concepts for illustrative purposes only and is not an extensive overview, and is not intended to identify key or critical elements, or to limit or constrain the inventions and examples in the detailed description. One skilled in the art will recognize other novel combinations and features from the detailed description.

According to the present disclosure, aspects of methods, devices, and systems of an energy management communication protocol for use in distributed, heterogeneous, mixed owners, and/or mixed types of power generation and storage systems. A communication protocol for management of the system resources, such as produced power, stored power, reserve power, emergency power, and/or the like, are described. The use of the communication protocol allows easy implementation in diverse environments, such as large heterogeneous sites, neighborhood subsystems, isolated micro-grid islands, and/or the like. The communication protocol uses a reduced command set combined with a built in cyclic perturbation technique to produce system-wide optimization of the storage versus generation costs. This allows dynamic optimization of highly heterogeneous systems with multiple independent owners, conflicting considerations, and/or the like. The protocol may be implemented with relay devices, that coordinate the network power generation with electrical loads, such as a central master device, such as a communication module, to broadcast commands, and individual system slave communication modules for receiving commands and conversion to the local power generation/storage actions.

As noted above, this Summary is merely a summary of some of the features described herein. It is not exhaustive, and it is not to be a limitation on the claims.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures. In the drawings, like numerals reference similar elements.

DETAILED DESCRIPTION

Figure 1:
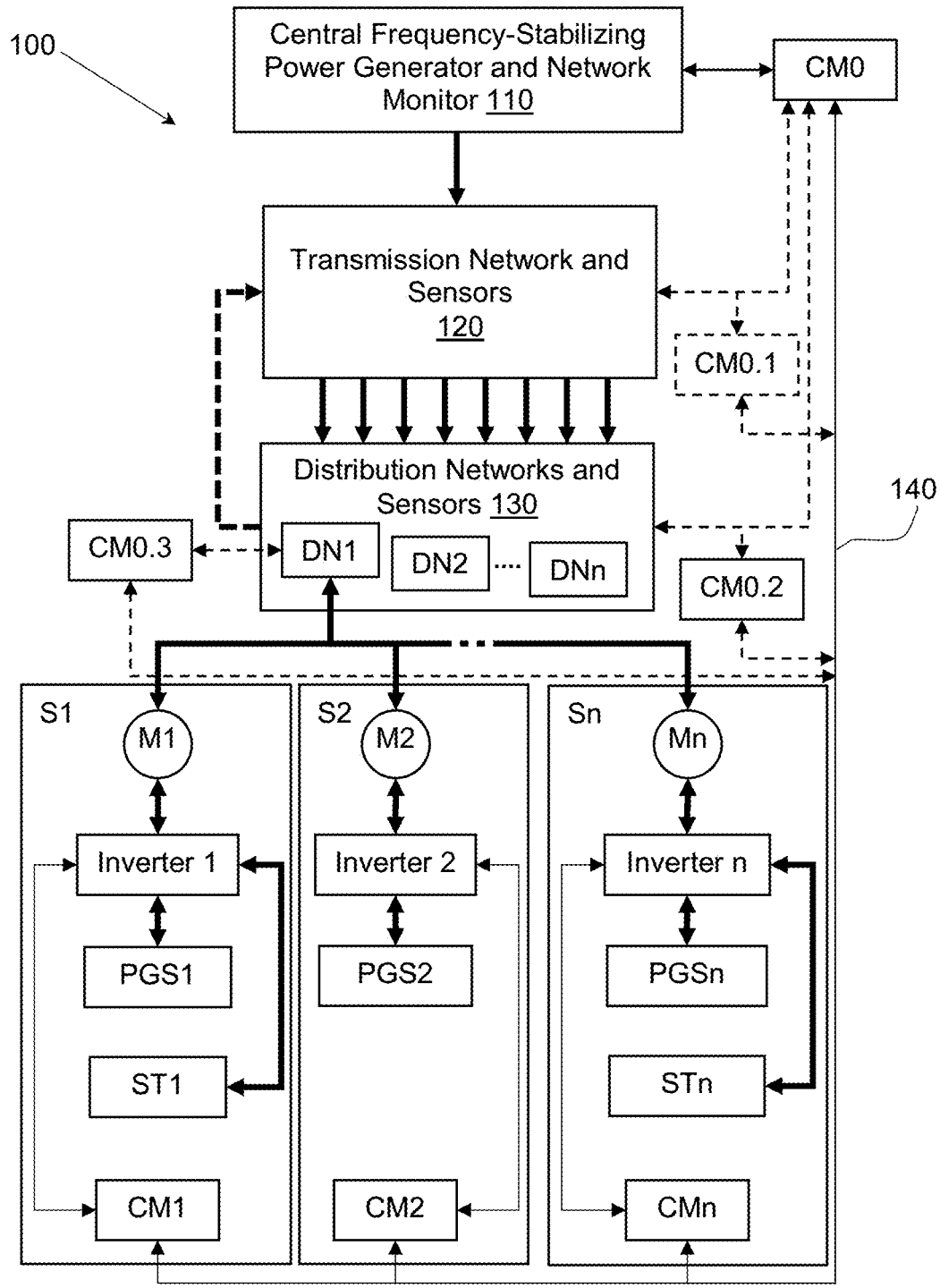
FIG. 1 shows schematically an electrical grid with distributed power generation systems, master communication modules, and slave communication modules.

The accompanying drawings, which form a part hereof, show examples of the disclosure. It is to be understood that the examples shown in the drawings and/or discussed herein are non-exclusive and that there are other examples of how the disclosure may be practiced.

Disclosed are aspects of systems, devices and methods that use a communication protocol and perturbation technique for energy management between electrical loads and electrical power generation and/or storage systems (PGSs) interconnected on an electrical network, such as a grid, a micro-grid, and/or the like. The communication protocol comprises two messages, one for increasing electrical power injection into the network from providers, and the other for reducing electrical power supply to the network. Each system of a network of systems may have local rules that determine how to respond to each message. The central processor that monitors the system balance and sends the messages may frequently perturb the load versus supply balance. The perturbations enable cycling out higher cost resource options in favor of lower cost resource options. In this manner, the system power distribution is dynamically optimized among the resources of the system.

Reference is now made to FIG. 1, which shows schematically an electrical grid 100 with distributed power generation systems, master communication modules, and slave communication modules. Shown in FIG. 1 are broad lines for power distribution, and narrow lines for communication. Dashed lines may indicate optional connections. Electrical grid 100 may comprise one or more central generators 110 that may provide power, stabilize grid frequency and/or voltage, monitor network and/or grid electrical parameters, provide spinning reserve, and or the like. Transmission network 120 may provide electrical power transmission lines at high voltages, switching stations, tie-lines, sensors for grid electrical parameter, and/or the like, whereby transmission network 120 may include one or more sensors. Transmission network 120 may supply electrical power to one or more distribution networks 130, such as multiple distribution sub-networks as at DN1, DN2, . . . up to DNn, and which may also provide sensors, transformers to decrease the high voltage to mid voltage, and/or the like. In some cases, the electrical power generated from individual PGSs may be passed to other distribution networks through the transmission lines. The sensors of transmission network 120 and/or distribution networks 130, may comprise Phasor Measurement Units (PMUs), smart-meters, smart load centers, and/or the like. Sensors may be used to determine the electricity production and/or consumption of a part or all of the electrical grid. For example, the sensors include current censors, power sensors, phase sensors, frequency sensors, voltage sensors, and/or the like.

An example distribution network DN1 may distribute the electrical power to multiple sites, such as S1, S2, . . . through Sn. Each site may comprise:
- a power meter (as at M1, Ms, . . . through Mn, where the power meters may be smart meters),
- one or more inverters (as at Inverter 1, Inverter 2, . . . through Inverter n, where the inverters may also be other types of power devices),
- one or more power generation systems (as at PGS1, PGS2, . . . through PGSn),
- one or more electrical storage devices (as at ST1, . . . through STn),
- and/or the like.

It may be noted that not all sites comprise all types of components, and some sites may be different, such as lacking a PGS, a storage device, an inverter, and/or the like. It may also be noted that electrical grid 100, transmission or distribution networks (as at 120 or 130), communication networks 140, or sites S1, S2, . . . through Sn, may be based on alternating current (AC), direct current (DC), or a combination of both.

The electrical grid of FIG. 1 may further comprise a master communication module CM0 logically connected to the generator and/or network monitor(s) to transmit commands to the slave communication modules of each site (as at CM1, CM2, . . . through CMn) through a communication path such as communication network 140 providing connectivity amongst the communication modules. Communication network 140 may comprise a wired physical layer, a wireless physical layer, a combination of both, or may be integrated into the electrical power transmission/distribution network(s). In some aspects, transmission network 120 may comprise one or more communication modules as at CM0.1. In some aspects, distribution networks 130 may comprise a central communication module CM0.2 or individual distribution sub-networks may comprise a communication module (as at DN1 and CM0.3). Intermediate communication module (as at CM0.1, CM0.2, CM0.3 and/or the like) may be master modules, slave modules or both, and may be configured as a hierarchal network of communication modules or each may operate independently. The site communication modules (as at CM1, CM2, . . . through CMn) may be slave modules and there may be at least one master communication module on communication network 140 (as at CM0, CM0.1, CM0.2, CM0.3, and/or the like).

Master communication module CM0 may be incorporated into one of inverters (inverter 1, inverter 2, . . . inverter n). For example, an inverter comprises master communication module functions and sends power commands to one or more slave inverters. Communication modules CM1, CM1, CM2, . . . . CMn may be incorporated into one or more power devices, such as one or more inverters. For example, an inverter comprises all master and slave communication module functionalities.

Figure 2:
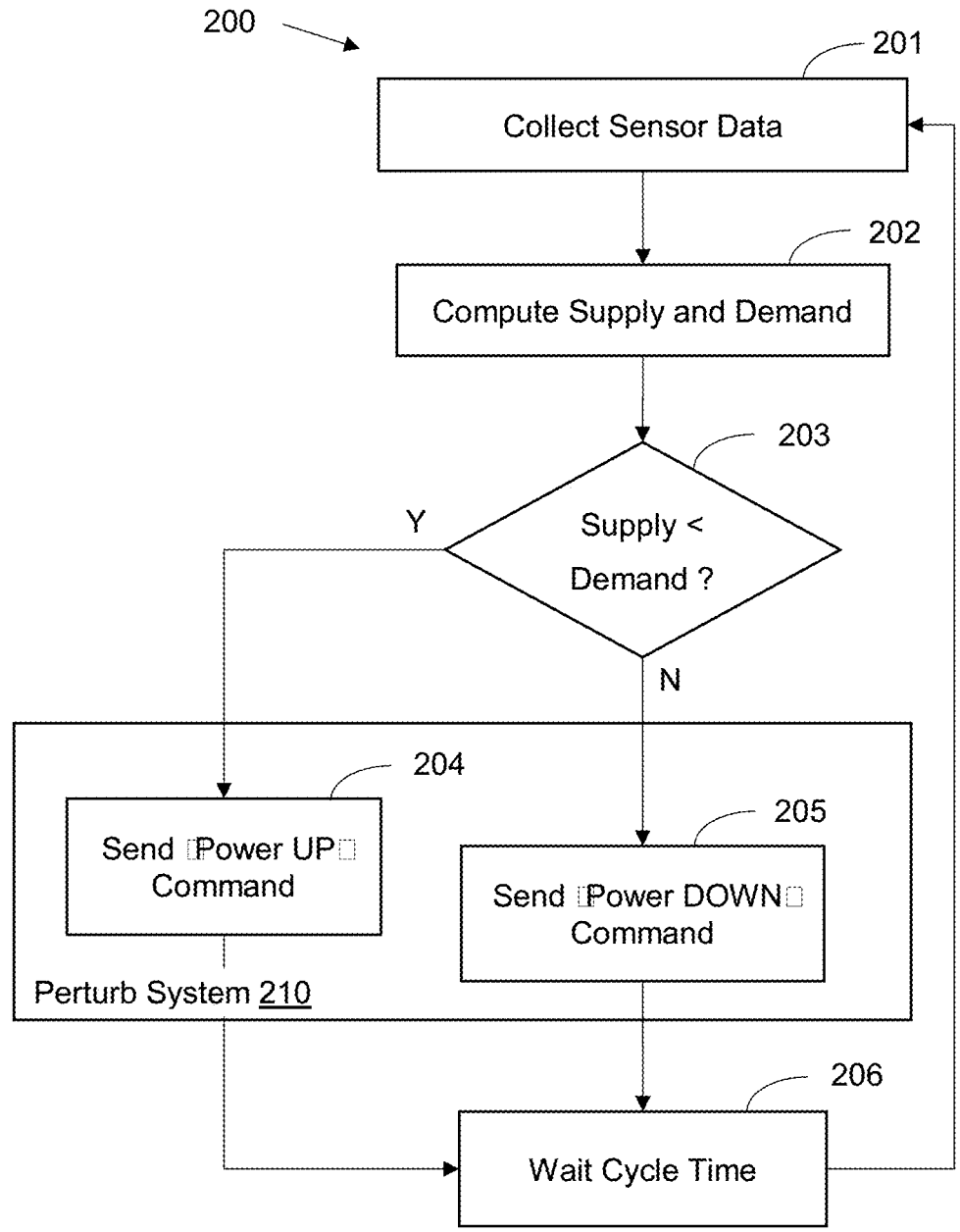
FIG. 2 shows a flowchart of a method for operation of a master communication module, according to illustrative aspects of the disclosure.

Reference is now made to FIG. 2, which shows a flowchart 200 of a method for operation of a master communication module, according to illustrative aspects of the disclosure. Once sensor data is collected in step 201, such as from Phasor Measurement Units (PMUs), remote stations, and/or from smart meters (as at M1, M2, . . . through Mn), an electrical power supply and demand may be computed in step 202, such as a real time supply/demand, a day-ahead supply/demand, a future supply/demand, and/or the like. When the supply is less than the demand as determined in step 203, a "power up" command may be sent in step 204. For example, if power consumption of a power device exceeds power generation of the power device (e.g., based on sensor values), then the "power up" command that includes an instruction for increasing power may be sent. In other words, the "power up" command may be sent when sensor values of power consumption sensors are greater than sensor values of power generation sensors. When the supply is greater than or equal to the demand as determined in step 203, a "power down" command may be sent in step 205. For example, if power consumption of a power device is less than or equal to power generation of the power device (e.g., based on sensor values), then the "power down" command that includes an instruction for decreasing power may be sent. In other words, the "power down" command may be sent when sensor values of power consumption sensors are greater than sensor values of power generation sensors. Sending a command (in step 204 or step 205) may be a perturbation 210 of the electrical grid system. In step 206, a time may be used to wait before the next cycle, such as to allow time for the power generation and/or storage systems to respond to the commands.

Figure 3:
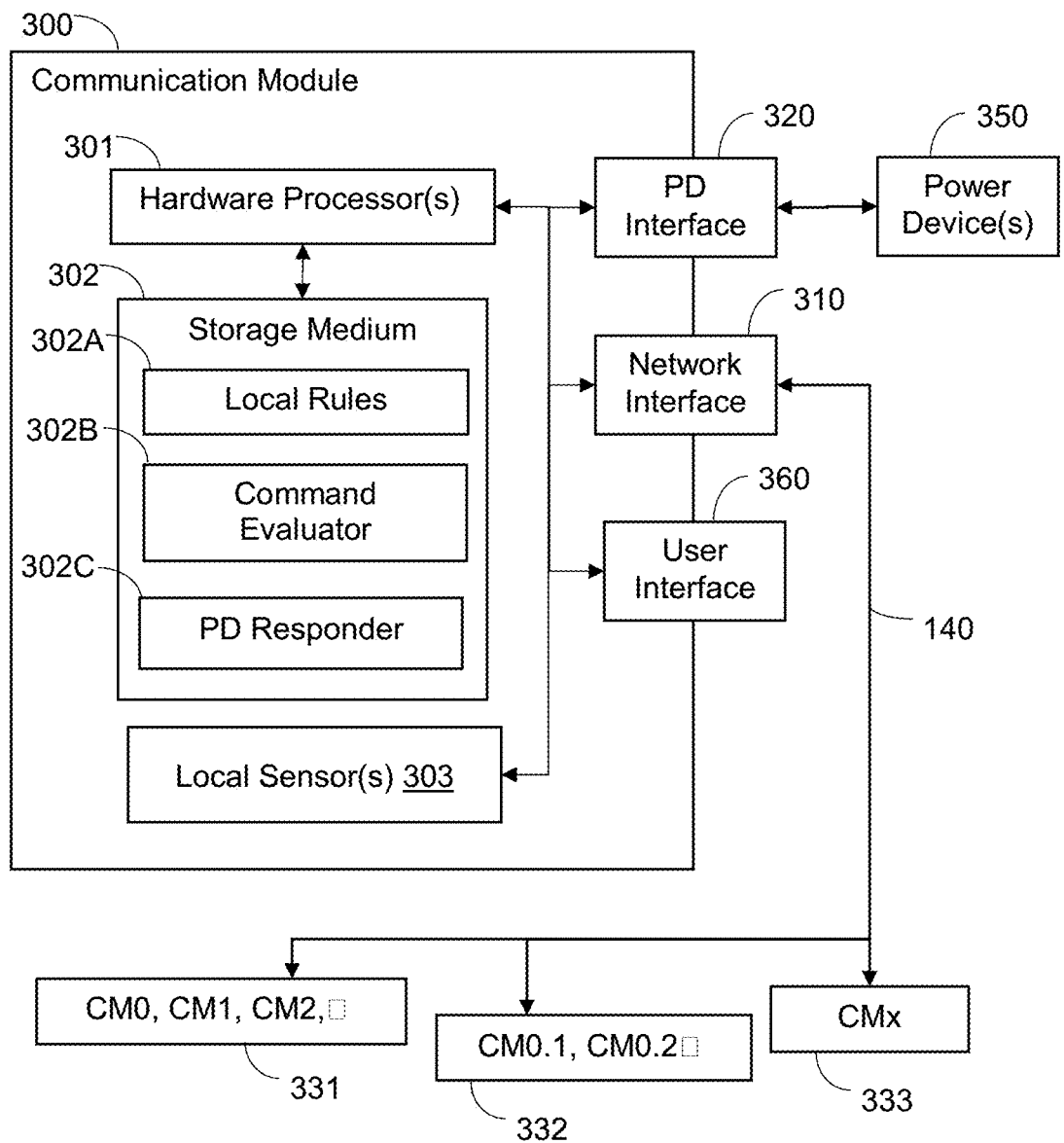
FIG. 3 shows schematically a communication module for grid stabilization, according to illustrative aspects of the disclosure.

Reference is now made to FIG. 3, which shows schematically a communication module 300 for grid stabilization. Communication module 300 comprises one or more hardware processors 301, a storage medium 302, local sensor(s) 303, and interfaces (as at 320, 310, and 360) to power device(s) 350, communication network 140 of FIG. 1, a user or operator (not shown), and/or the like. Storage medium 302 may comprise modules for local rules 302A, command evaluation 302B, power device response 302C, functions and computing of power supply/demand (not shown), and/or the like. Network interface 310 may receive or send commands from other communication modules such as CM0, CM0.1, CM0.2, CM1, CM2, CMx, and/or the like (as at 331, 332, and 333), through communication network 140.

Figure 4:
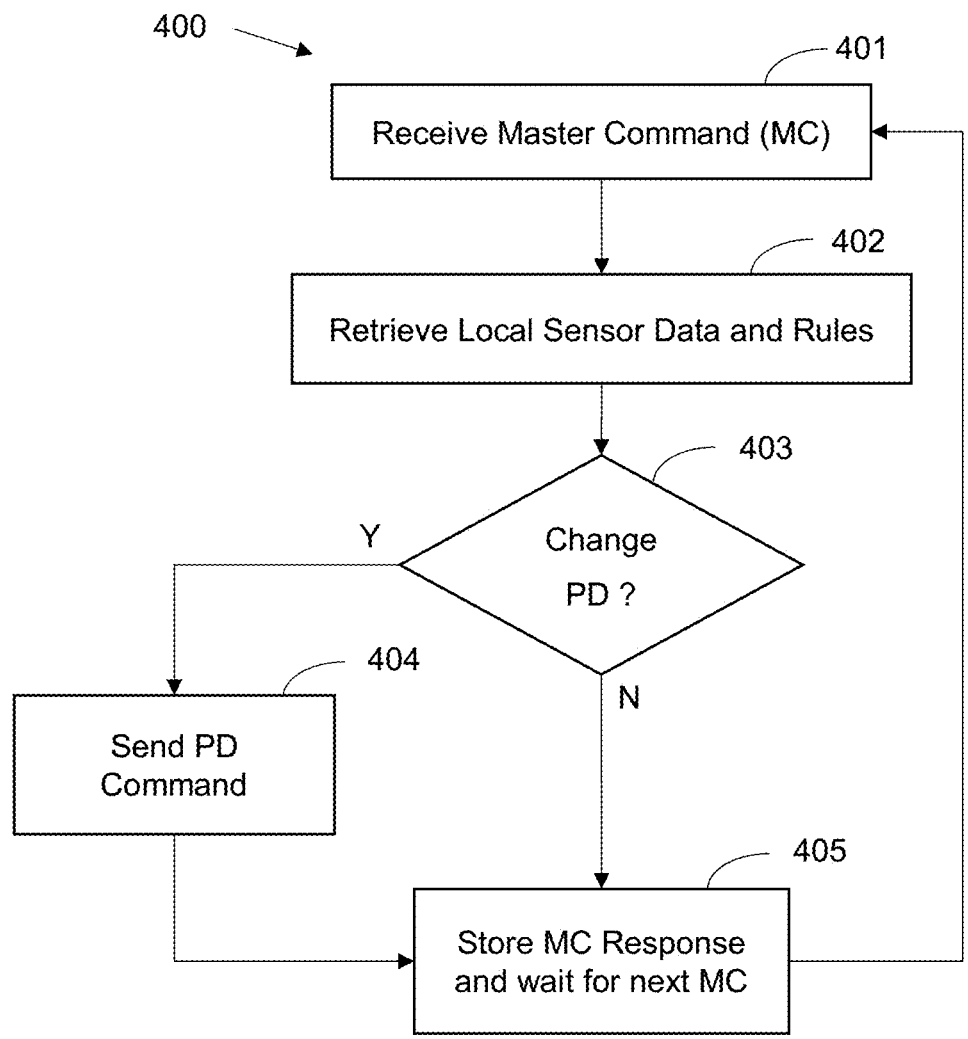
FIG. 4 shows a flowchart of a method for operation of a slave communication module, according to illustrative aspects of the disclosure.

Reference is now made to FIG. 4, which shows a flowchart 400 of a method for operation of a slave communication module, according to illustrative aspects of the disclosure. A slave communication module (as at CM1, CM2, . . . through CMn) may receive, at step 401, a master communication module command (MC) and may retrieve, at step 402, local sensor data (such as from sensors 303) and rules (such as a set of rules from local rules storage module 302A). When it is determined in step 403, based on the command, the set of rules, sensor values, and other data, that a change is to be applied to a power device (PD), such as an inverter, a command may be sent to the PD in step 404. In other words, based on a power command, etc., a power device command (e.g., an operational modification to a power generation system, a power storage system, and or an electrical load) may be determined. The MC, values, rules, data, and PD command may be stored in step 405, such as stored locally on storage medium 302, for future reference.

For example, in a virtual power plant that comprises multiple distributed power generation components, resources may be optimized using the communication protocol, communication modules, and perturbation techniques. For example, a utility company may enable a best effort system-wide dynamic optimization using the communication protocol and perturbation technique. For example, a single user with multiple sites or sites in multiple substations may enable a dynamic optimization of the user resources using the communication protocol and perturbation technique.

For example, multiple users on an island, neighborhood grid, micro-grid, single/multiple substations, and/or the like, may enable a dynamic optimization of the user resources using the communication protocol and perturbation technique. For example, a network of PGSs may be residential, commercial, industrial, and/or the like. For example, PGSs may by solar-power systems, wind turbine systems, diesel/propane/gasoline generators, hybrid systems, and/or the like. For example, a rule for solar power generation system may comprise PV-panel installation costs, maintenance costs, sustainable costs, and/or the like. For example, a rule for solar PGS may comprise inverter power ratings, storage power ratings, and/or the like. For example, a power storage system may comprise batteries with multiple number of units and types, such as Li-ion, lead-acid, fuel cell, heat, compressed gas/air, kinetic, potential energy, hybrid, and/or the like.

When multiple PGSs are tied together to form a network, and each PGS is different in terms of owner entities, power devices, installation years, types of power generation, types of power storage, and the like, it becomes a complicated problem to optimize all the owner needs/desires, system capabilities, systems costs, and the like. For example, the unit commitment problem (UCP) in electrical power production in unregulated markets, with distributed, heterogeneous and/or fragmented PGS networks, may require complex solutions in terms of both the technical devices and the algorithms. The typical methods of overcoming the differences may include: homogenizing the system PGS components or controllers, requiring owner commitments for injection or demand of electricity to the networks, planning the central power generators without consideration of the future availability of distributed PGSs, and/or the like. Electrical power markets have been developed to allow wholesale monetization of the electrical power in a free market approach, but these do not solve the smaller scale problems at the substation and lower levels.

The UCP may be defined to provide fuel efficiency solutions, and when applied to small scale networks, may be further extended by other constraints. For example, the UCP may be extended to meet emission constraints, such as carbon emission constraints, waste-water constraints, heat emission constraints, light/noise pollution constraints, and/or the like. For example, the UCP may be extended to uncertainty constraints, such as uncertainty in demand, uncertainty in renewable energy resources, uncertainty in central production (central generator malfunctions or the like), variations in fuel prices, and/or the like. For example, the UCP may be extended to security constraints, religious constraints, political constraints, ideological constraints, and/or the like.

Meeting supply and demand on the large area grid is considered by the operating reserve. Of these there are spinning reserves, non-spinning reserves, replacement reserves, primary reserve (up to 30 second response time), secondary reserves (response time between 30 seconds and 15 minutes), tertiary reserves (typically manual activation and/or response time at greater than 15 minutes), and/or the like. Aspect of meeting supply/demand needs on local and/or small scale grids may include lower response times, greater uncertainties, larger power fluctuations in percentages, and/or the like.

Using the technical elements of a simplified communication protocol for generating supply/demand responses from PGSs, a loose-control central perturbation algorithm, and local rules for each PGS that are aligned with the PGS owner needs/requirements, allows a class of solutions to the small to medium scale UCP on the individual PGSs in a distributed network. For example, the communication protocol may be based on a master-slave topology, a broadcast network topology, and/or the like. For example, the master processor of a master/slave topology may be incorporated (e.g., using a broadcast protocol) into any of the power devices of the systems, a dedicated separate processing unit, a cloud based processor, and/or the like. For example, master commands may comprise a "more power" command, a "less power" command, and/or the like. For example, a communication protocol may be a 2-bit power line communication protocol, a frequency-shift keying (FSK) protocol, a frequency or voltage response protocol, and/or the like. For example, a frequency or voltage response protocol may use a reduced grid frequency or voltage to send a "more power" command and an increased grid frequency or voltage to send a "less power" command.

For example, each slave (such as a power generation system, a power storage system, a combined generation and storage system, or the like) may have a rule/function for determining a response to a "more power" command, a "less power" command, and/or the like. The rule and/or function may be temporally dependent, such as having different rules/function s depending on the time of day, the day of the week, the week/month of the year, and/or the like. For example, when a power increase/decrease is requested, the rule/function may determine how much to increase/decrease the power supplied to the grid. For example, up and/or down factors may be used. For example, the up/down factors may be configure to allow easy power increases, resist power decreases, and/or the like. For example, factors may be determined dynamically based on:

Storage system state of charge and/or the like,
Storage system state of health and/or the like,
Wear leveling and/or the like,
Charge leveling and/or the like,
Backup power needs (such as backup power for summer and winter and/or the like),
Emergency power needs (such as minimum power for two months and/or the like),
Religion (such as Shabbat observance and/or the like), Ideals (such as grid refusal and/or the like),
Politics (such as civilian disobedience and/or the like), and/or the like.

For example, when a master sends a "more power" command, one or more slaves may monitor the frequency of the commands to determine the urgency. The slave may then increase a threshold for giving power when master is requesting insistently more power, such as by sending a "more power" command once every second for 3 minutes. The master commands may be sent by a digital protocol (such as I2C, 1-wire, or the like), by an analog protocol, and/or the like. The physical layer may be wired electrical (such as power line communications and/or the like), wired electronic (such as RS485 and/or the like), electromagnetic wireless (such as Bluetooth, Wi-Fi, WiMAX, and/or the like), acoustic, infrared/photonic, and/or the like. As used herein, the terms module, master, slave, CM, and/or the like refer to the respective communication module according to aspects of the disclosed techniques.

Adaptive functions may determine the amount of power to increase or decrease. For example, a semi-closed loop dynamic optimization algorithm may allow the power commands to be sent on a cyclic basis, getting near an optimal solution be not actually reaching optimization so that the power generation of the network cycles between too much power generation to too little power generation. For example, a simulated annealing algorithm may be used that periodically, such as once in a few seconds, a few minutes, a few hours, or the like, and randomly sends an up or down power command. For example, a tango optimization method may be used that requires power up commands to be issued in pairs, followed by a power down command, even when the supply versus demand is near optimal. For example, a power up command may require an increase of at least x percentage, where x is between 1 and 25 percent, and a power down of x/2, thus creating up power steps that are larger than the down power steps.

The command to increase power may be a fixed command (such as a single bit-on for power up and off for power down), a value (percentage to increase, amount to increase, threshold to use, and/or the like), a more complicated handshaking (negotiating, bidding, bartering, and/or the like), or the like. For example, each node (such as a site, a user, and/or the like) has a rule for responding to the up power (UP) or down power (DOWN) commands, as well as factors for each source controlled by the node. For example, a PV source may have a high UP factor to preferentially use the PV source when an UP command is received. Similarly, the PV source will have a small DOWN factor, so that a down command received may preferentially retain the PV source as a power source since lowering the power from the PV may waste the energy of the solar power generation system. Factors may reflect the use costs, and/or the like. A central master may keep issuing UP commands until the network of nodes is producing more power than is needed, and then issue a down command. The continuous up/down adjustment may result in a perturbation of the system power balance and allow the high costs sources to be eventually reduced in favor of the low cost sources. For example, a contradictory power command may be issued to perturb the power generation resources.

Electrical energy networks may include power plants, micro-grids, virtual power plants, buildings, campuses, neighborhoods, islands, and/or the like. A network of electrical energy systems may be incorporated into a vehicle, such as a car, a boat, a plane, a ship, and/or the like. The networks may comprise two configurations, such as a first configuration connected to an electrical grid, a second configuration disconnected from an electrical grid, and/or the like.

For example, a building comprises a first inverter (installed in 1995) for charging a battery and a second inverter (installed in 2001) for charging a compressed gas electrical energy storage system. Each inverter is connected to a renewable energy power generation source, such as a PV string, a wind turbine, and/or the like. A central master computer (installed in 2018) measures the power needed by the building loads, such as using a power meter. The master computer sends up or down power commands to the inverters using CMs (installed in 2018 with the master computer) that convert the up or down commands to the relevant inverter specific inputs that determine the percentage of renewable energy to use for charging the batteries or energy storage systems and to use for the building loads. The CMs may include rules that preferentially charge the battery or compressed gas electrical energy storage system. For example, the compressed air system has a lower cost for storing electrical energy during the first three years and the battery has lower cost thereafter, and the CM rules reflect the storage system age (such as less than or greater than a threshold number of years since installation, for example).

A communication protocol may include a value, denoted num, with the up or down commands, such as UP+num or DOWN+num may indicate the amount of power needed. A rule or function for responding to an up or down power command may include a weighted parameter value of the percentage charge or discharge of a battery.

Figure 5A:
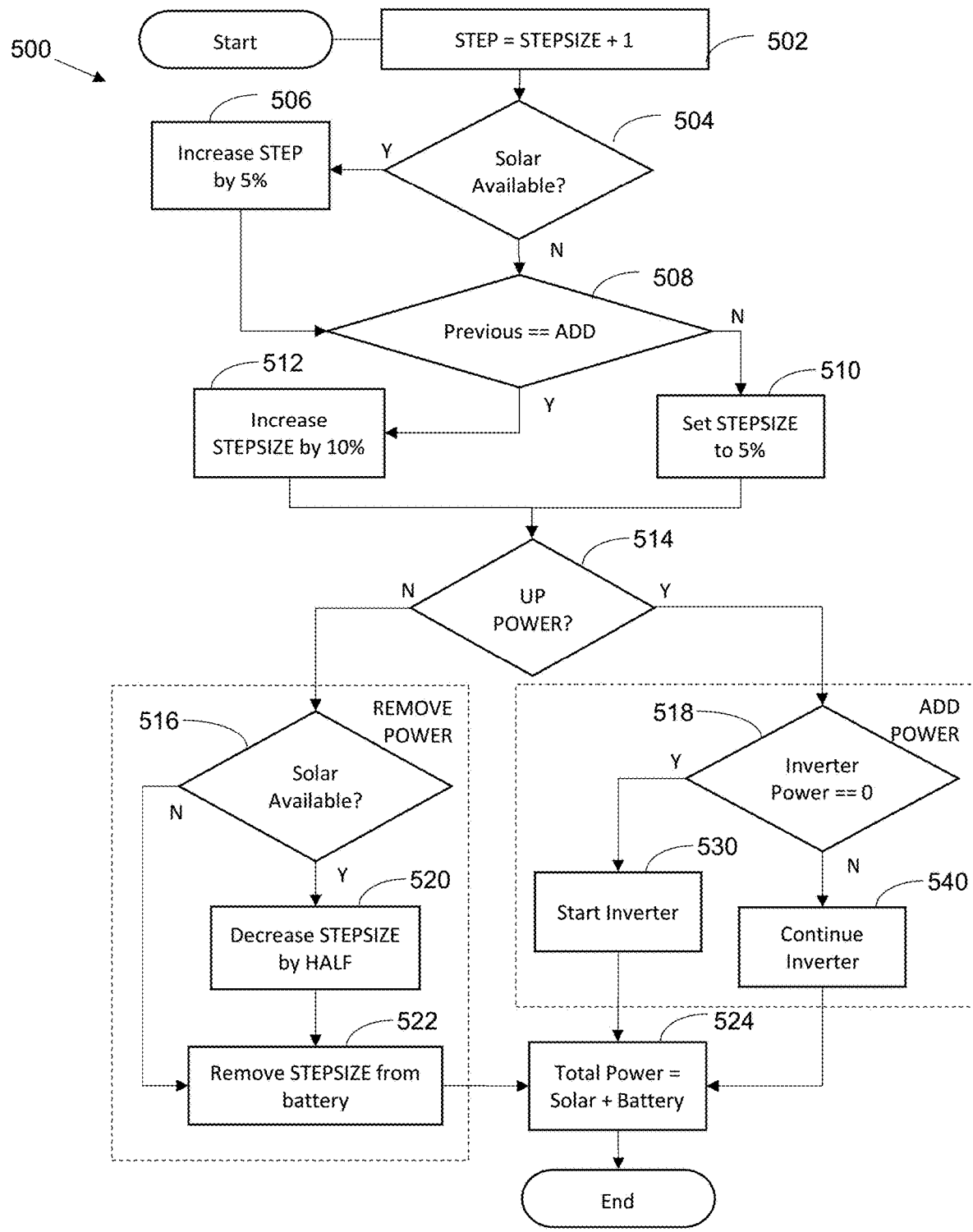
FIGS. 5A, 5B, and 5C show flowcharts of an example local rule for a slave communication module, according to illustrative aspects of the disclosure.
Figure 5B:
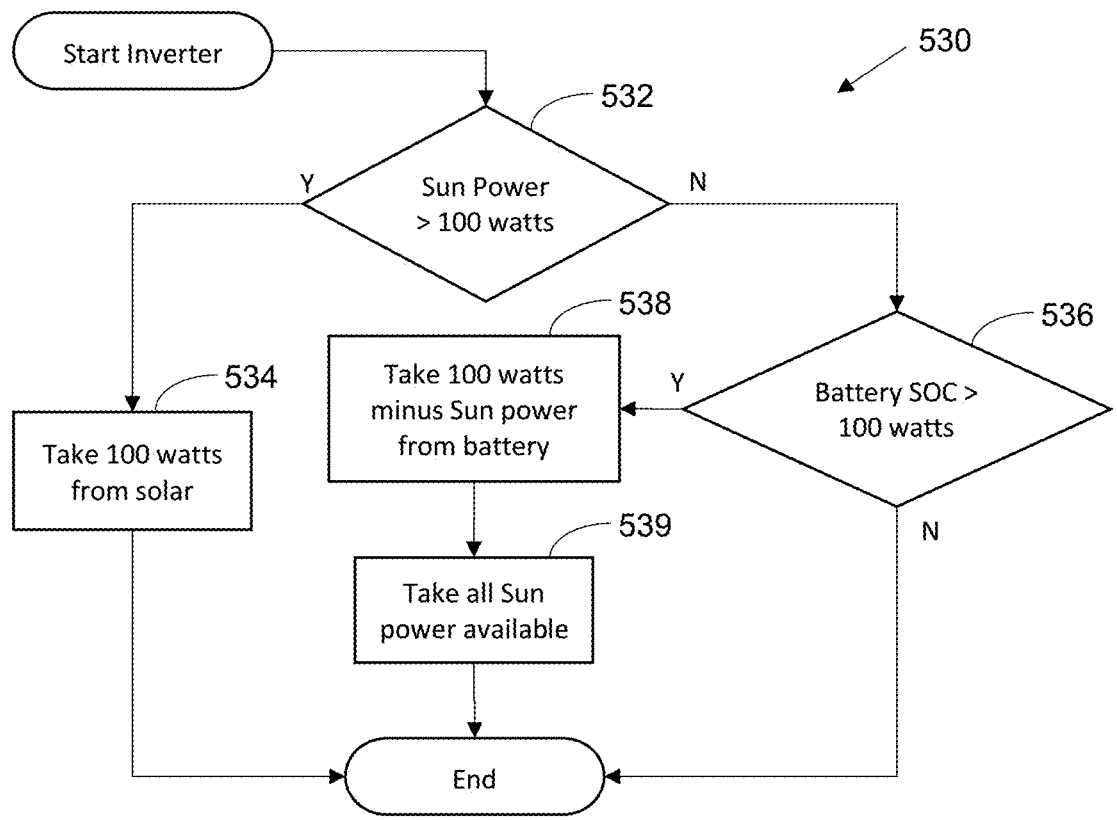
Figure 5C:
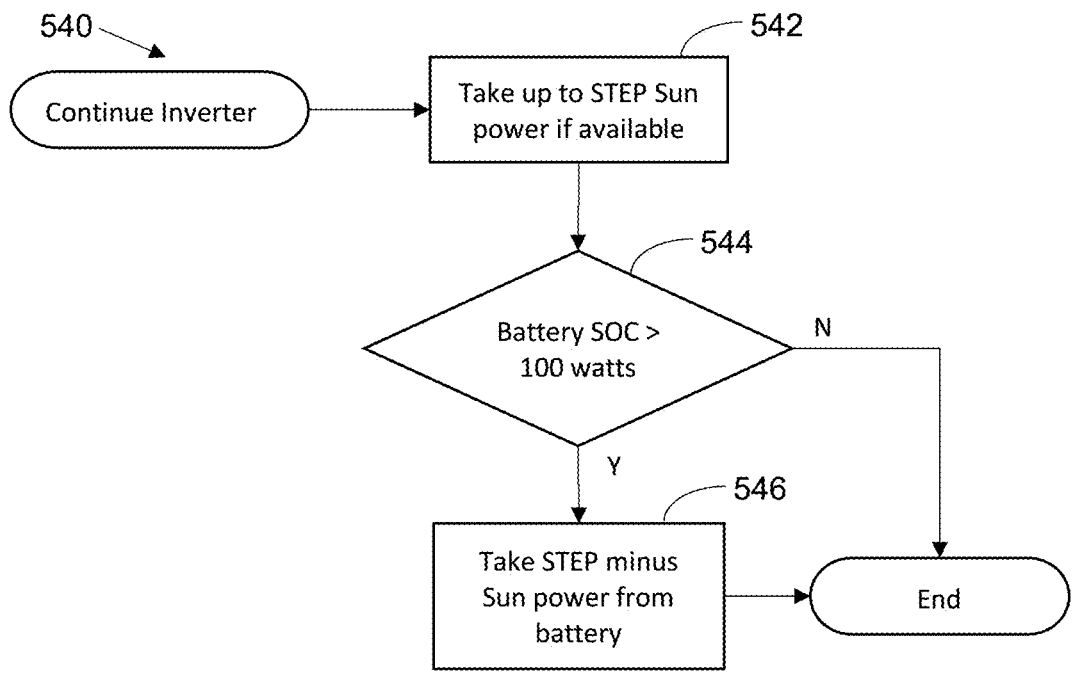

Reference is now made to FIGS. 5A, 5B, and 5C, which show flowcharts as at 500, 530, and 540 of an example local rule for a slave CM, according to illustrative aspects of the disclosure. The example flowcharts illustrate rules for a slave CM to implement for each cycle of a master command, such as an up command, a down command, a start inverter command, and/or the like.

With reference to FIG. 5A, in step 502 the step is set to stepsize plus 1. In step 504, it is determined whether solar power is available, and when Yes, in step 506 the step is increased by 5%. When solar power is not available, it is determined in step 508 when the previous command was to add power. When Yes, the stepsize is increased by 10% as at step 512, and when No the stepsize is set to 5% as at step 510. Next, at step 514 it is determined whether power needs to be increased or decreased. When power is to be decreased, at step 516 it is determined if solar energy is available. When Yes, the stepsize is decreased by half (50%) as at step 520, and when No, stepsize power is removed from battery as at step 522. When power is to be increased as determined by step 514, Inverter power is determined as at step 518, and when inverter power is zero, inverter is started as at step 530, and when inverter power is non-zero inverter operation is continued as at step 540. At step 524 the total power is computed from the solar power and battery power.

With reference to FIG. 5B, a method 530 for starting inverter is described. At step 532 it is determined when the solar power available is greater than 100 watts. When yes, the 100 watts are taken from the solar power as at step 534. When no, the state of charge (SOC) of the battery is determined (greater than 100 watts) as at step 536. When the SOC is >100 watts, 100 watts minus the solar power are taken from the battery as at step 538, and all solar power available is used as at step 539. When SOC is less than or equal to 100 watts, nothing is done. With reference to FIG. 5C, a method 540 for continuing inverter operation is described. At step 542 "step" sun power is used if available.

Next it is determined at step 544 if the battery SOC is >100 watts. When yes, step minus sun power is taken from battery as at step 546. When no, nothing is done.

In some examples, a site with multiple inverters/systems may need to limit the total power inversion on all inverters, such as when clipping of the multiple inverters is needed. A main master controller may send a keep-alive command (KA) that incorporates an up or down power command.

Communication modules may be arranged in a cascade or hierarchal configuration. For example, when each element of an electrical grid (such as a central power generators, transmission line operators, electrical distributors, and/or the like) is owned and/or operated by separate entities, such as private companies, local government agencies, national companies, private owners, and/or the like, the central generator may be connected to a master communication module (CM), which sends messages to a slave CM for each power transmission line controller, which in turn are the master(s) for several slave CMs, one for each electrical distributor network controller, which in turn are the master(s) for several slave CMs of distributed power generation and/or storage systems. In this example, each CM when acting as a master may determine when to send "Power Up" or "Power Down" commands, and when acting as a slave may determine how to respond to the master commands.

A simple installation of master and slave CMs may comprise one master and multiple slaves, but in some circumstances one or more slaves may be connected to multiple masters, and the local rules of each slave module determine how to respond to each master command, and how to resolve conflicting commands. For example, a master module (MM) connected to the central power generator may use the grid frequency to signal to the slaves to send more or less power, and the slave module may receive further power up or down commands from a transmission line master module (TLMM), a distribution network master module (DNMM), and/or the like. The slave comprises local rules that may assign priority to MM, TLMM, DNMM, and/or the like.

In some configurations, the slave CMs may be connected to power devices of PGSs that are on separate distribution networks. For example, in a virtual power plant application, the master may be connected to the internet and may be configured to commit to supply a predetermined amount of power. The slaves may be connected to multiple PGSs distributed across the grid, such as in different areas, regions, sub-grids, and/or the like. When the power actually delivered is less than the threshold, the master may send to a "up power" command to the slaves, and the salves with available power may increase the power feed-in to the grid.

A virtual power plant may use a large number of sites that are controllable by a central processor as a large-scale electrical power generation resource. The different sites may be in the same are or in different area's regions, and each may comprise electrical energy resources, such as solar power, wind turbines, energy storage batteries, and/or the like. By being controllable by the central processor in accordance with one or more aspects of the disclosure, the energy at each site may be made available to the grid when needed.

In a campus application, according to one or more aspects of the disclosure, a large number of buildings may have PGSs and belong to the same entity or owner. The energy available in one building be made available to other buildings based on the total power consumption of the campus. For example, a central controller may be connected to a master CM that sends up power and down power commands to the slave units. The slave units in turn may have different rules for each building based on the energy requirement profiles of each building. When the central controller detects that there is a new draw of power from the grid, it may send an up power command to the slave units. Depending on the rules for each building, the slave units may attempt to increase the power that is feed from the building to the campus, reduce the electricity demand of the building, and/or the like.

When an electrical grid covers an island, which is disconnected from other electrical grids, and some of the island residents have PGSs, such as based on solar energy, wind energy, tide energy, and/or the like, and electrical energy storage is available on the grid through the electricity provider and/or the PGS, aspect of the techniques disclosed herein may be applied to allow the sharing of energy resources on a best effort basis. For example, a master communication module (MCM) may be connected to the central electrical generator controller, and when the frequency drops below a threshold, the controller may send an "up power" command to SCM devices connected to the residential PGS. Each residential PGS may retrieve the local rules and sensor values, and determine how much power to send to the grid. The controller may start a countdown timer and wait for the PGSs to respond to the command. Once the timer completes the countdown, the controller may determine if another command should be sent or if the generator rotation speed stabilizer should be turned on. Based on the countdown timer, the controller may consider the response to the sent command as primary, secondary, or tertiary reserves of the island grid.

In some installations, a large number of buildings, such as a group of building, a campus, and/or the like may share more than one electrical grid connect and/or may be connected to several electrical grid substations. For example, when a campus requires a peak power of more the two (2) mega-watts, the campus may be connected to several electrical grid substations. In this example, the electrical power of the buildings may be drawn from any one of the substations. The master CM may be connected to a central controller for the campus, where the central controller monitors the electrical power consumption of each building and determines how much power to draw from each substation. For example, when a certain substation has a higher electricity cost, the controller may determine that drawing power is more economical from the other substations, and send a command to the slave CMs connected to that substation to send more power to the campus grid, and send a command to the other slave CMs, connected to the other substations to lower power sent to the campus grid. The result is that the campus electrical controller can direct how much power is being drawn from each substation and how much to use from the reserve power resources of the buildings, such as from backup batteries, the solar PGSs, the wind turbine PGSs, and/or the like. For example, a controller or hardware processor associated with a master communication module may use a master-slave broadcast protocol that comprises two commands, a power up command and a power down command. For example, the master-slave broadcast protocol comprises only two commands, a power up command and a power down command. For example, a controller or hardware processor associated with a master communication module may not expect an answer from the slave modules, and wait a certain time before reissuing a command, thereby giving slave modules time to command the respective power devices, the respective power devices increasing or decreasing power, and the power change detected by the master communication module. For example, the hardware processor is combined into a power device, a utility-scale power generation system, an electrical network monitoring system, or the like.

A micro-grid may be a portion of the electrical grid that may be disconnected and/or reconnected to the grid. When disconnected, the micro-grid may comprise a central controller for monitoring the micro-grid electrical consumption versus production. A master CM may be connected to the central controller, and when the controller detects an imbalance between the consumption and production, an appropriate command may be sent to the slave CMs connected to individual PGSs. The total power production and/or consumption of a micro grid may be between 5 kilo-watts (KW) and 50 mega-watts (MW), such as 25 KW, 50 KW, 100 KW, 250 KW, 400 KW, 630 KW, 800 KW, 1000 KW, 1250 KW, 1600 KW, 2000 KW, 5 MW, 10 MW, 20 MW, 40 MW, 50 MW, or the like. The primary voltage of the micro-grid may be (line-to-line): 6 kilo-volts (Kv), 7.2 kV, 10 kV, 12 kV, 22 kV, 24 KV, 31.5 kV, 33 kV, 34.5 kV, 35 kV, 36 Kv, or the like, and the secondary voltages may be (line-to-line): 240 volts, 380 volts, 400 volts, or the like.

Here, as elsewhere in the specification and claims, ranges can be combined to form larger ranges.

Specific dimensions, specific materials, specific ranges, specific resistivities, specific voltages, specific powers, specific shapes, and/or other specific properties and values disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (for example, the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

In the description of various illustrative features, reference is made to the accompanying drawings, which form a part hereof, and in which is shown, by way of illustration, various features in which aspects of the disclosure may be practiced. It is to be understood that other features may be utilized and structural and functional modifications may be made, without departing from the scope of the present disclosure.

Terms such as "multiple" as used in this disclosure indicate the property of having or involving several parts, elements, or members.

It may be noted that various connections are set forth between elements herein. These connections are described in general and, unless specified otherwise, may be direct or indirect; this specification is not intended to be limiting in this respect, and both direct and indirect connections are envisioned. Further, elements of one feature in any of the embodiments may be combined with elements from other features in any of the embodiments, in any combinations or sub-combinations.

All described features, and modifications of the described features, are usable in all aspects of the inventions taught herein. Furthermore, all of the features, and all of the modifications of the features, of all of the embodiments described herein, are combinable and interchangeable with one another.

The invention claimed is:

1. A method comprising:
   determining power consumption and power generation of a power unit, wherein the power unit comprises at least one of a power generation system, a power storage system, or an electrical load; and
   sending, to the power unit, a power command configured to periodically cause the power unit to adjust a net power balance between the power consumption and the power generation by performing at least one of:
      decreasing the power generation by a first amount based on the power consumption being greater than the power generation, or
      increasing the power generation by a second amount based on the power consumption being less than the power generation, wherein the second amount is greater than the first amount.

2. The method of claim 1, further comprising:
   retrieving at least one of a rule or a local sensor value; and
   determining the power command based on the at least one of the rule or the local sensor value.

3. The method of claim 1, further comprising:
   determining the power command based on a difference between a power generation sensor value and a power consumption sensor value.

4. The method of claim 1, wherein the second amount is between 1% and 25%.

5. The method of claim 1, further comprising:
   sending, to the power unit, a second power command configured to cause the power unit to perform at least one of:
      increasing the power generation based on the power consumption being greater than the power generation, or
      decreasing the power generation based on the power consumption being less than the power generation.

6. The method of claim 1, wherein the sending of the power command is performed by a master device to the power unit, and using a broadcast protocol, wherein the power unit comprises a slave device.

7. The method of claim 1, wherein the second amount is double the first amount.

8. A power control device comprising:
   a communication device configured to connect to a power unit, wherein the power unit comprises at least one of a power generation system, a power storage system, or an electrical load;
   at least one hardware processor configured to:
      determine power consumption and power generation of the power unit; and
      send, to the power unit, a power command configured to periodically cause the power unit to adjust a net power balance between the power consumption and the power generation by performing at least one of:

decreasing the power generation by a first amount based on the power consumption being greater than the power generation, or increasing the power generation by a second amount based on the power consumption being less than the power generation, wherein the second amount is greater than the first amount.

9. The power control device of claim 8, wherein the at least one hardware processor is further configured to:
retrieve at least one of a rule or a local sensor value; and
determine the power command based on the at least one of the rule or the local sensor value.

10. The power control device of claim 8, wherein the at least one hardware processor is further configured to:
determine the power command based on a difference between a power generation sensor value and a power consumption sensor value.

11. The power control device of claim 8, wherein the second amount is between 1% and 25%.

12. The power control device of claim 8, wherein the at least one hardware processor is further configured to:
send, to the power unit, a second power command configured to cause the power unit to perform at least one of:
increasing the power generation based on the power consumption being greater than the power generation, or
decreasing the power generation based on the power consumption being less than the power generation.

13. The power control device of claim 8, wherein the at least one hardware processor is configured to send the power command using a broadcast protocol, and wherein the power control device is a master device of the broadcast protocol.

14. The power control device of claim 8, wherein the second amount is double the first amount.

15. A system comprising:
a power unit comprising at least one of a power generation system, a power storage system, or an electrical load;
a power control device comprising:
a communication device configured to connect to the power unit;
at least one hardware processor configured to:
determine power consumption and power generation of the power unit; and
send, to the power unit, a power command configured to periodically cause the power unit to adjust a net power balance between the power consumption and the power generation by performing at least one of:
decreasing the power generation by a first amount based on the power consumption being greater than the power generation, or
increasing the power generation by a second amount based on the power consumption being less than the power generation, wherein the second amount is greater than the first amount.

16. The system of claim 15, wherein the at least one hardware processor is further configured to:
retrieve at least one of a rule or a local sensor value; and
determine the power command based on the at least one of the rule or the local sensor value.

17. The system of claim 15, wherein the at least one hardware processor is further configured to:
send, to the power unit, a second power command configured to cause the power unit to perform at least one of:
increasing the power generation based on the power consumption being greater than the power generation, or
decreasing the power generation based on the power consumption being less than the power generation.

18. The system of claim 15, wherein the communication device is configured to send the power command using a broadcast protocol, wherein the power control device is a master device of the broadcast protocol, and wherein the power unit is a slave device of the broadcast protocol.

19. The system of claim 15, wherein the at least one hardware processor is further configured to determine the power command based on a difference between a power generation sensor value and a power consumption sensor value, and wherein the power consumption sensor value is measured via at least one of an electrical load sensor or a battery charging load sensor.

20. The system of claim 15, wherein the second amount is between 1% and 25%, and wherein the second amount is double the first amount.

* * * * *